United States Patent Office 3,355,466
Patented Nov. 28, 1967

3,355,466
COMPLEXES OF HEAVY METAL HALIDES AND N,N,N',N' - TETRAKIS(HYDROXYALKYL)ALKYLENE DIAMINES
Harold L. Elkin, Levittown, Pa., assignor to Thiokol Chemical Corporation, Bristol, Pa.
No Drawing. Filed July 2, 1963, Ser. No. 292,479
10 Claims. (Cl. 260—429)

This invention relates to metal halide complexes and to a method for their preparation. These complexes are exceptionally useful accelerators for the vulcanization of sulfur-curable polyurethane elastomers.

Polyurethane polymers, having olefinic side chains containing double-bond sites vulcanized by sulfur, have been found to possess properties which are much superior to those exhibited by products which are obtained from polyurethane polymers having recurring urea groups in the chain which have been cured by using organic diisocyanates. However, considerable difficulty has been encountered in exploiting the curing potential of these olefinic bonds on the side chains because they do not react satisfactorily with the conventional sulfur curing systems which are used for natural rubber, GR-S, and neoprene. The curing cycle is too long when conventional systems are used and the process is uneconomical.

Some metal halide complexes for the vulcanization of sulfur-curable polyurethane elastomers are known in the prior art. These compounds are usually metal halide comfactorily with the conventional sulfur curing systems which are used for natural rubber, GR-S, and neoprene. The latter materials tend to produce degradation and discoloration of the urethane polymers treated therewith; the former materials do not provide a sufficiently rapid cure of the polymer.

It is an object of the present invention to provide novel metal co-ordination complexes which are excellent accelerators in polymer curing or vulcanization operations. It is an object of the present invention to provide novel complexes which will accelerate the sulfur-curing of polyurethane elastomers containing olefinic side chains. It is also an object of the invention to provide a method for curing elastomeric compositions with these complexes. It is another object to provide unique organo-metallic compounds. It is a further object of the invention to provide vulcanized polyurethane compositions having improved resistance to degradation and discoloration. Other objects of the invention are in part obvious and in part pointed out hereinafter.

The present invention provides novel metal halide co-ordination complexes that are particularly adapted for use as vulcanization accelerators in polymer curing processes and a method for the production of these complexes. Furthermore, by use of these novel complexes, a method is provided for manufacturing elastomer compositions with excellent resistance to degradation.

The metal halide complexes of the invention are co-ordination complexes of an N,N,N',N'-tetrakis(hydroxyalkyl)alkylene diamine and the salts of a heavy metal halide and are of the formulae:

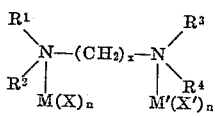

and

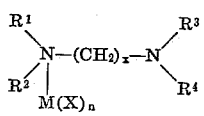

in which $R^1$, $R^2$, $R^3$ and $R^4$ represent the same or different hydroxyalkyl radicals; M and M' represent the same or different heavy metal atoms; X and X' are the same or different halides; n and n' represent the valence of M and M'; and x represents an integer of from 2 to 6.

The hydroxyalkyl radical is preferably a lower alkyl radical, for example, those having from two to four carbon atoms. Typical of suitable radicals are the 1-hydroxyethyl, 1-hydroxypropyl, 1-hydroxybutyl, 2-hydroxybutyl and 3-hydroxybutyl radicals. The preferred hydroxyalkyl radical is the 2-hydroxypropyl radical.

M and M' are heavy-metal atoms. Lead, zinc, cobalt, manganese, cadmium, chromium, antimony, tin, and tellurium are among the suitable elements; zinc, cadmium, chromium, cobalt and manganese are preferred.

The novel products of the present invention are solid, high melting chemical complexes which are normally produced in the form of free flowing powders. These complexes are preferably prepared by reacting one or more heavy metal halides with an N,N,N',N'-tetrakis(hydroxyalkyl)alkylene diamine in an inert solvent medium and recovering the solid product. The solvent may be water or any organic solvent which is inert in respect to the reactants and product. Acetone is the preferred solvent because the products produced therewith are substantially less hygroscopic than products prepared in such solvents as water or alcohol. There are other advantages in using acetone as the solvent medium. Because the complex is insoluble in acetone and precipitates out of the solvent on formation, there is very little contamination of the product by the soluble starting materials and any contamination is easily removed with an acetone wash. Furthermore, the product prepared in acetone may be readily dried without heating and the solvent recovery operation, desirable for the economical production of the complexes when water or alcohol are used as solvents, may be avoided. Indeed, the acetone solvent may be recycled directly for use in further processing.

The complexes may also be formed by contacting the reactants directly in the absence of a solvent. Instead of a single salt, a combination of metal halides may be used according to the present invention. Where a mixture of metal halides is used, the product will contain a mixture of the metal halide complexes. Where less than two mols of the metal halide are reacted per mol of the diamine compound, the resulting complex product will contain, on the average, proportionally less of the metal halide and will be proportionally less active as an accelerating agent. It is preferable to use those complexes made with approximately two mols of the halide per mol of the diamine compound.

Typical of the heavy metal halides suitable for use in the process of the present invention are the chloride, bromide, and iodide salts of lead, zinc, cobalt, manganese, chromium, antimony, tin and tellurium.

The N,N,N',N' - tetrakis(hydroxyalkyl)alkylene diamines preferably used in preparing the products of the invention are N,N,N',N'-tetrakis(hydroxy lower alkyl) ethylene diamines. Especially useful is N,N,N',N'-(2-hydroxypropyl)ethylene diamine.

It is desirable that the reaction vessel in which the complex is formed have a glass or enamel, rather than a metal, liner in order to obviate the possibility of the metal halide reacting with the metal surface of the reaction vessel.

The temperature at which the reactions are run will determine the time needed for completion of the reaction. About one hour at 60° C. is adequate.

When acetone is used as the inert solvent medium, the reaction system is refluxed at the desired reaction temperature and a complex forms in the acetone system. The complex precipitates out and a slurry is formed. Refluxing of the solvent is desired to provide the agitation necessary to maintain the slurry. The system is refluxed for about an hour, cooled, filtered, and vacuum dried. The filtrate may be reused in subsequent reactions.

When water or an alcohol is used as the solvent, the reaction system need not be refluxed during the reaction period and a portion of the solvent present may be allowed to escape into the atmosphere. No precipitate forms with these solvents. At the conclusion of the desired reaction period, the solvent is removed by, for example, vacuum or spray drying techniques. To facilitate recovery of the products prepared in water or alcohol, it is desirable to increase the solids content of the reaction mix to about 75% by weight.

The instant novel complexes are very useful as compounding ingredients in the sulfur-curing of polyurethane polymers having olefinic side chains such as polyalkyleneether or polyalkyleneester polyurethane polymers.

Conventional elastomer processing steps may be used in the fabrication of cured articles. In carrying out the process of the present invention for molded articles, the uncured polyurethane polymer is normally milled to a smooth sheet on a rubber mill and the various ingredients are incorporated by intimate mixing with the polymer on a mill. The composition is then sheeted off the mill, placed in a suitable mold, which is then closed, and the curing process is completed by heating the mold. The temperature and time used to effect a cure are interrelated. Higher temperatures permit shorter cure times; lower temperatures require longer cure times. In general, a curing time of about 45 minutes is adequate when a curing temperature of about 285° F. is used.

The metal halide complex made with two mols of metal halide per mol of diamine is incorporated with the other ingredients in the polyurethane polymer cure system in the range of 0.2 to 5.0, and preferably from 0.5 to 2.5, parts per 100 parts of polymer.

The amount of sulfur which is used may range from 0.1 to 3.0, and preferably 1 to 3, parts per 100 parts of polyurethane polymer. Compositions containing larger amounts of sulfur result in products with higher modulus values. Other materials that may be used in these cure systems include the 2,2'-dithiobisbenzothiazole and 2-mercaptobenzothiazole accelerators. The amount of 2,2'-dithiobisbenzothiazole which is used should range from 0.5 to 10, and preferably 3 to 5, parts per 100 parts of elastomer, however, it is understood that, as in the addition of sulfur, greater or lesser amounts may be used. In general, it is desirable to have a weight ratio of sulfur to 2,2'-dithiobisbenzothiazole of less than 1:1, with a preferred weight ratio range being from 1:4 to 3:5. The amount of 2-mercaptobenzothiazole which is used should range from 0.5 to 5 parts, and preferably approximate 2 parts, per 100 parts of elastomer; however, greater or less amounts may be used.

In addition to the ingredients discussed above which are normally used in the curing of urethane polymers according to the present invention, it is to be understood that other additives and compounding ingredients may be used also. Vulcanization accelerators and activating agents, such as cadmium stearate and zinc stearate may be used. Fillers and pigmenting substances may also be used among which are hydrated silicas (such as those sold under the trade designation of Hi-Sil 233), inorganic pigments (such as those sold under the trade designations Ultramarine Blue and Titanox AMO), and carbon blacks (such as the super abrasion oil furnace black sold under the trade designation Philblack E).

A standard polymer system was prepared for use in the preparation of plastic-type compositions in which the utility and advantages of the aforementioned complexes could be demonstrated. For convenience, this polymer will be referred to henceforth as Polymer A. The method by which it was prepared follows:

A mixture of 297.6 grams (4.8 mols) of ethylene glycol, and 91.2 grams (1.2 mols) of propylene glycol was charged to a glass reaction vessel fitted with an agitator, thermometer, nitrogen inlet tube, steam jacketed condensor, cold water condenser. The latter is utilized for refluxing the water produced during the reaction. A distilling head was provided for the removal of water produced during the reaction. To the reaction mixture, 800 grams of adipic acid were added; this quantity of adipic acid (5.5 mols) was selected to provide an excess of the hydroxy acid and thus assure that the copolyester molecules would be hydroxy terminated. It was desired that the product be a copolyester glycol with a hydroxyl value of 1.13% and a theoretical molecular weight of 3000.

This mixture was heated to 160° C. under nitrogen purging and with stirring. As esterification proceeded, the water of reaction was refluxed until the temperature of the reaction system fell to 130° C. Then the water was allowed to distill from the reaction mix. As the water was removed from the system, the reaction temperature was allowed to rise to 200° C., until about 97% of the theoretical quantity of water from the esterification reaction had been removed. The heating was continued until an acid number of somewhat less than 3 was obtained. The reaction was then stopped by cooling the mix to ambient temperature. The copolyester glycol so produced had a number average molecular weight of about 2900 as determined by end group analysis.

Of the copolyester glycol produced above, 361.13 grams (0.25 equivalent weight) were charged to a glass reactor fitted with agitator, thermometer, feed funnel and cold water reflux condenser which was open to the atmosphere through a drying tube. The temperature of the reaction system was raised to 50° C. whereupon 47.0 grams of an isomer mixture consisting of 4 parts by weight of 2,4 tolylene diisocyanate and 1 part by weight of 2,6 tolylene diisocyanate was added over a 10-minute period. The reaction proceeded under a blanket of nitrogen at 80° C. for 4 hours. The isocyanate-terminated prepolymer had about 3% by weight of reactive isocyanate.

A quantity of 702 grams of the prepolymer was charged to a glass reactor fitted with an agitator, thermometer, and a filling funnel open to the atmosphere through a drying tube. The temperature of the reaction system was raised to 80° C. Thirty-three grams (0.25 mol) of glycerol alpha allyl ether (GAE) were charged into the reactor within a ten-minute interval with vigorous agitation. Mixing was continued for 15 minutes. The temperature of the reaction system was maintained at 80° C. for 4 additional hours. At the end of this time, the reaction product was placed in an oven at 100–125° C. for 24 hours. A firm, light-amber colored, polyurethane crude rubber, Polymer A, was obtained which showed excellent processing characteristics on a mill with roll temperatures of 150° F. Using the small spindle for ten minutes at 212° F., the material exhibited a Mooney viscosity of 42. The Shore A hardness value was 35. When the material was aged at about 75° F., the hardness increased, reaching 39 after two weeks and leveling at 45 after sixteen weeks.

In order to point out more fully the nature of the present invention, the following specific examples are given as illustrative embodiments of the present process and products produced thereby. These examples illustrate the preparation of the novel metal complex accelerators and also illustrate the preparation of polymer compositions in which the accelerators are utilized. The proportions of the ingredients in the polymer compositions are given in parts by weight. In each instance, if not otherwise stated, the rubber composition was blended on a rubber roll mill and then cured at 287° F. for 45 minutes. The mechanical properties of the cured compositions were measured after this heat treatment. The 200%, 300%, and 500% moduli, and the tensile strength were measured in pounds per square inch of polymer cross-sectional area. The elongation and permanent set were recorded as a percentage of the original sample's dimension. Tear resistance was measured in pounds per inch. Hardness is recorded according to the Duro, Shore A hardness scales.

The Mooney scorch values, indicative of the tendency of compositions to vulcanize during processing, is more fully described in ASTM Special Technical Publication No. 184, "Glossary of Terms Relating to Rubber and Rubber-Like Materials."

The yellow index, a measure of the color, is more fully described in "Photoelectric Tristimulus Colorimetry With Three Filters," U.S. Dept. of Commerce, National Bureau of Standards—Circular C429, July 30, 1942.

Example 1

A solution of 13.6 grams of zinc chloride in 80 grams of denatured ethanol was prepared at 30° C. in a glass reaction vessel. The solution was filtered; however no solid residue was present. To the filtrate, 29.2 grams of N,N,N',N'-tetrakis(2 - hydroxypropyl)ethylene diamine was added dropwise. The mixture was agitated with a mechanical stirrer for 30 minutes. No precipitation was observed. The mixture was then heated to 60° C. with continuous agitation. An additional 13.6 grams of zinc chloride was added, and the temperature of the mixture was maintained at 60° C. for one hour. The mixture was placed in a vacuum oven at 100° C. for 12 hours. White crystals of the complex formed as the solvent evaporated. Total yield of N,N,N',N' - tetrakais(2 - hydroxypropyl) ethylene diamine:zinc chloride complex was 56.0 grams; the complex contained 22.66% chlorine.

The following batches, comprising the complex, were prepared on a rubber roll mill.

|  | Batch 1 | Batch 2 |
| --- | --- | --- |
| Polymer A | 100 | 100 |
| Benzothiazyl disulfide | 4.7 | 4.7 |
| 2-Mercaptobenzothiazole | 2.0 | 2.0 |
| N,N,N',N'-tetrakis(2-hydroxypropyl) ethylene diamine:zinc chloride complex | 0.67 | 0.67 |
| Cadmium Stearate | 0.5 | 0.5 |
| Ultramarine Blue | 0.25 | |
| Titanox AMO | 15.0 | |
| Hydrated Silica | 5.0 | |
| Sulfur | 1.0 | 1.0 |
| Philblack E | | 30.0 |

The physical properties after a 45-minute cure at 287° F. were as follows:

|  | Batch 1 | Batch 2 |
| --- | --- | --- |
| Modulus: | | |
| 200% | 155 | 1,160 |
| 300% | 395 | 2,045 |
| 500% | 1,715 | 3,755 |
| Tensile Strength | 3,645 | 4,115 |
| Elongation | 645 | 535 |
| Hardness | 59 | 78 |
| Permanent Set | 25.0 | |
| Tear Resistance | 145 | 245 |

|  | Stock 1 | Stock 2 |
| --- | --- | --- |
| Yellow Index (20 hours): | | |
| Original | 116 | |
| UV | 491 | |
| Mooney Plasticity (ML4 at 212° F.) | 26 | 34 |
| Mooney Scorch (10 pt. rise at 250° F.), minutes | 44 | 45 |

Example 2

A solution of 13.6 grams zinc chloride was prepared in 160 ml. of water. The mixture was filtered. A quantity of 29.2 grams of N,N,N',N'-tetrakis(2-hydroxypropyl) ethylene diamine was added dropwise to the filtrate at 30° C. During this addition the reactants were agitated continuously. The temperature rose to about 50° C. Then the mixture was heated to 60° C. and held at that temperature for 30 minutes. An additional 13.6 grams of zinc chloride was then added at 60° C. and the mixture was agitated at that temperature for one and one-half hours longer. Thereupon, the mixture was placed in a vacuum oven set at 100° C. for approximately 6 hours, during which time white crystals of the complex formed as the solvent evaporated. Additional water was removed by filtration and the complex was collected as a filter cake and dried. Total yield of N,N,N',N'-tetrakis(2-hydroxypropyl)ethylene diamine:zinc chloride complex was 54.0 grams. Infra-red analysis of the complex indicated the following composition: Percent Cl, 24.53; percent N, 4.76; percent C, 28.02; percent H, 5.18; percent Zn, 22.03. The melting point was 192.5° C.

A composition was prepared containing 100 parts of Polymer A with 4 parts of benzothiazyl disulfide, 2 parts of 2-mercaptobenzothiazole, 0.5 part of cadmium stearate, 15 parts Titanox AMO, 5 parts of hydrated silica, 0.25 part of Ultramarine Blue, 1 part of sulfur and 0.61 part of N,N,N',N'-tetrakis(2-hydroxypropyl)ethylene diamine: zinc chloride complex. The compounded material was cured in molds in a press at 287° F. for 45 minutes. The cured elastomer showed the following properties:

| | |
| --- | --- |
| Tensile | 3934 |
| Elongation | 590 |
| Modulus, percent: | |
| 200 | 233 |
| 300 | 489 |
| 500 | 2310 |
| Hardness | 56 |
| Tear | 172 |
| Permanent set | 12.5 |

A second portion of the uncured compounded material prepared as described above was calendered. The sheet obtained was rolled up and placed in an oven set at 270° F. for 6 hours after which the following properties were measured:

| | Stock A |
| --- | --- |
| Tensile | 3319 |
| Elongation | 522 |
| Modulus, percent: | |
| 200 | 230 |
| 300 | 530 |
| 500 | 2685 |
| Tear | 64 |
| Percent set | 4.6 |

Example 3

A quantity of 292.0 grams of N,N,N',N'-tetrakis(2-hydroxypropyl)ethylene diamine was charged to a glass reaction vessel. To 63 ml. of water there was added, with constant agitation, 272.6 grams of zinc chloride. This latter mixture was charged to the reaction vessel. The heat of reaction evolved immediately. The resulting mixture was divided into three parts, A, B, and C. Each part was dried in an oven under the following conditions:

Part A—vacuum oven set at 70° C.
Part B—forced draft oven set at 130° C.
Part C—forced draft oven set at 160° C.

Analysis of the three portions of the complexes revealed the following compositions, all indicative of the formation of N,N,N',N'-tetrakis(2-hydroxypropyl)ethylene diamine: zinc chloride complex:

| Portion | Percent | | | |
| --- | --- | --- | --- | --- |
| | N | $H_2O$ | Cl | Zn |
| Part A | 4.77 | 1.14 | 25.26 | 23.20 |
| Part B | 4.90 | .29 | 25.31 | 23.50 |
| Part C | 4.84 | .46 | 25.47 | 23.50 |

Example 4

A quantity of 233.6 grams of N,N,N',N'-tetrakis(2-hydroxypropyl)ethylene diamine was heated slowly to 60° C. in a 1000 ml. flask equipped with a mechanical stirrer and a nitrogen blanket. Upon the addition of 217.6 grams of zinc chloride thereto, it was necessary to utilize an ice bath to maintain the temperature of the mixture at 75° C. or below. After the heat of reaction had subsided, a slightly scorched, reddish-brown, viscous mass was recovered and placed in a vacuum oven at about 70° C. for drying.

The following analysis of the product indicated the formation of the N,N,N′N′-tetrakis(2-hydroxypropyl) ethylene diamine:zinc chloride complex.

|  | Percent |
|---|---|
| Cl | 25.90 |
| Zn | 23.78 |
| N | 4.36 |
| $H_2O$ | 1.39 |

Example 5

0.1 mol of $CdCl_2$ was added to 80 grams of water. To this mixture was added 29.2 grams of N,N,N′,N′-tetrakis(2-hydroxypropyl)ethylene diamine. The resulting mixture was heated to 60° C. and held at that temperature for 30 minutes. An additional 0.1 mol of metal halide was then added to the mixture, and the temperature was maintained at 60° C. for another 30 minutes.

The resulting mass was placed in a vacuum oven at 100° C. for 12 hours to remove the solvent and allow crystals of N,N,N′,N′-tetrakis(2-hydroxypropyl)ethylene diamine:$CdCl_2$ complex to form.

A composition was prepared comprising 100 parts of Polymer A, 4.7 parts benzothiazyl disulfide, 2 parts 2-mercaptobenzothiazole, 0.94 part complex (as prepared above), 1.3 parts zinc stearate, 0.35 part Ultramarine Blue, 15 parts Titanox AMO, 10 parts hydrated silica, 1 part sulfur.

The physical properties of the compound after curing for 45 minutes at 287° F. were:

| Tensile | 5031 |
|---|---|
| Elongation | 677 |
| Modulus, percent: | |
| 200 | 333 |
| 300 | 667 |
| 500 | 2560 |
| Hardness | 61 |
| Tear | 170 |
| Percent set | 17.1 |
| Mooney scorch at 250°: | |
| Low pt. | 10 |
| 4 pt. rise | 38 |
| 10 pt. rise | 41 |

Example 6

0.1 mol of $MnCl_2$ was added to 80 grams of ethanol. To this mixture was added 29.2 grams of N,N,N′,N′-tetrakis(2-hydroxypropyl)ethylene diamine. The resulting mixture was heated to 60° C. and held at that temperature for 30 minutes. An additional 0.1 mol of metal halide was then added to the mixture, and the temperature was again maintained at 60° C. for 30 minutes.

The resulting system was placed in a vacuum oven at 100° C. for 12 hours to remove the solvent and allow crystals of N,N,N′,N′-tetrakis(2-hydroxypropyl)ethylene diamine:$MnCl_2$ complex to form. The melting range of the product was 262–267° C.

Example 7

0.1 mol of $CoCl_2$ was added to 80 grams of ethanol. To this mixture was added 29.2 grams of N,N,N′,N′-tetrakis(2-hydroxypropyl)ethylene diamine. The resulting mixture was heated to 60° C. and held at that temperature for 30 minutes. An additional 0.1 mol of metal halide was then added to the mixture, and the temperature was again maintained at 60° C. for 30 minutes.

The resulting system was placed in a vacuum oven at 100° C. for 12 hours to remove the solvent and allow crystals of N,N,N′,N′-tetrakis(2-hydroxypropyl)ethylene diamine:$CoCl_2$ complex to form. The melting range of the product was 255–260° C.

Example 8

0.1 mol of $CrCl_3$ was added to 80 grams of ethanol. To this mixture was added 29.2 grams of N,N,N′,N′-tetrakis(2-hydroxypropyl)ethylene diamine. The resulting mixture was heated to 60° C. and held at that temperature for 30 minutes. An additional 0.1 mol of metal halide was then added to the mixture, and the temperature was again maintained at 60° C. for 30 minutes.

The resulting system was placed in a vacuum oven at 100° C. for 12 hours to remove the solvent and allow crystals of N,N,N′,N′-tetrakis(2-hydroxypropyl)ethylene diamine:$CrCl_3$ complex to form. The melting range of the product was 293–295° C.

Example 9

0.1 mol of $CdCl_2$ was added to 100 grams of methanol. To this mixture was added 29.2 grams of N,N,N′,N′-tetrakis(2-hydroxypropyl)ethylene diamine. The resulting mixture was heated to 60° C. and held at that temperature for 30 minutes. An additional 0.1 mol of metal halide was then added to the mixture, and the temperature was again maintained at 60° C. for 30 minutes.

The resulting system was placed in a vacuum oven at 100° C. for 12 hours to remove the solvent and allow crystals of N,N,N′,N′-tetrakis(2-hydroxypropyl)ethylene diamine:$CdCl_2$ complex to form. The complex contained 22.20% chlorine.

A composition was prepared comprising 100 parts of Polymer A, 4.7 parts benzothiazyl disulfide, 2 parts 2-mercaptobenzothiazole, 0.67 part complex (as prepared above), 1.3 parts zinc stearate, 1.35 parts Ultramarine Blue, 15 parts Titanox AMO, 10 parts hydrated silica, 1 part sulfur.

The physical properties of the compound after being cured for 45 minutes at 287° F. were:

| Tensile | 4572 |
|---|---|
| Elongation | 625 |
| Modulus, percent: | |
| 200 | 240 |
| 300 | 543 |
| 500 | 2587 |
| Hardness | 60 |
| Tear | 170 |
| Percent set | 14 |
| Mooney scorch at 250°: | |
| Low pt. | 8 |
| 4 pt. rise | 28 |
| 10 pt. rise | 30 |

Example 10

A quantity of 22.8 grams of cadmium chloride was added to 100 grams of methanol. With continuous agitation, 29.2 grams of N,N,N′,N′-tetrakis(2-hydroxypropyl) ethylene diamine was added to the mixture. The mixture was heated to 60° C. and held at that temperature for 30 minutes. Then 13.6 grams of zinc chloride was added, and the temperature was maintained at 60° C. for an additional 30 minutes. The mixture was placed in a vacuum oven set at 100° C. for approximately 12 hours to remove the solvent and to allow the white crystals of the N,N,N′,N′-tetrakis(2-hydroxypropyl)ethylene diamine: zinc chlorine-cadmium chloride complex to form.

Analysis of the complex revealed a chlorine content of 22.4%, the theoretical chlorine content of the complex.

A composition was prepared comprising, in parts by weight, 100 parts Polymer A, 4.7 parts benzothiazyl disulfide, 2 parts of 2-mercaptobenzothiazole, 1.03 parts of the N,N,N′,N′-tetrakis(2-hydroxypropyl)ethylene diamine:zinc chloride-cadmium chloride complex, 1.3 parts zinc stearate, 0.35 part Ultramarine Blue, 15 parts Titanox AMO, 10 parts hydrated silica, and 1 part of sulfur.

The physical properties of the compound after being cured for 45 minutes at 287° F. were:

Tensile _____ 4367
Elongation _____ 637
Modulus, percent:
  200 _____ 247
  300 _____ 560
  500 _____ 2223
Hardness _____ 60
Tear strength _____ 200

*Example 11*

A one liter, glass, round-bottomed, three-necked flask was equipped with reflux condenser, mechanical stirrer and a thermometer. Over a 15-minute period, 200 ml. of acetone, 101.4 grams of N,N,N',N'-tetrakis(2-hydroxypropyl)ethylene diamine, and 95 grams of $ZnCl_2$ were added sequentially to this flask with stirring. The temperature rose from 25 to 54° C. At this point 25 ml. of acetone were added to the reactor. Thereafter, the contents were maintained at reflux temperatures for 30 minutes, at the end of which time the mix appeared to thicken. An additional 133 ml. of acetone was then charged to the pot. After another 40 minutes, heating was discontinued and the pot contents were permitted to cool to 25° C. The solid product was separated by filtration through a Büchner funnel and dried for approximately 16 hours at 1 in. Hg absolute pressure in an oven set at 50° C. A clean, dry, non-hygroscopic, white, powdered product was obtained which had a melting point range of 198–204° C. This material was identified as N,N,N',N'-tetrakis(2-hydroxypropyl)ethylene diamine:$ZnCl_2$ complex. The amount of product obtained was 158.4 grams, 81% of the theoretically possible yield. The complex was divided into a number of portions and the following compositions were prepared:

|  | 1 | 2 | 3 | 4 |
|---|---|---|---|---|
| Polymer A | 100 | 100 | 100 | 100 |
| Benzothiazyl disulfide | 4.7 | 4.7 | 4.7 | 4.7 |
| 2-mercaptobenzothiazole | 1.5 | 1.5 | 1.5 | 1.5 |
| N,N,N',N'-tetrakis(2-hydroxypropyl)ethylene diamine: $ZnCl_2$ complex | 0.16 | 0.32 | 0.645 | 1.29 |
| Cadmium Stearate | 0.5 | 0.5 | 0.5 | 0.5 |
| Titanox AMO | 15.0 | 15.0 | 15.0 | 15.0 |
| Hydrated Silica | 10.0 | 10.0 | 10.0 | 10.0 |
| Sulfur | 1.0 | 1.0 | 1.0 | 1.0 |

The physical properties were measured after a 45-minute cure at 287° F. The results are given below:

|  | 1 | 2 | 3 | 4 |
|---|---|---|---|---|
| Tensile Strength | 4,615 | 5,120 | 5,040 | 4,420 |
| Elongation | 670 | 650 | 615 | 586 |
| Tear Resistance | 240 | 250 | 270 | 250 |
| Permanent Set | 12.5 | 10.9 | 9.3 | 7.8 |

*Example 12*

A five-gallon stainless steel reactor, equipped with cooling coils, was charged with 8.28 liters of acetone and 5.16 pounds of N,N,N',N'-tetrakis(2-hydroxypropyl)ethylene diamine while stirring. To this mix was added 4.84 pounds of powdered zinc chloride. The temperature of the reactants was maintained below 100° F. by utilizing the cooling coils. The reactants were then heated to about 135° F. and maintained at that temperature for about 30 minutes. Then the mix was cooled to about 80° F. The product was filtered. An acetone-wet filter cake was obtained and dried at about 140° F. and 0.9 in. Hg absolute pressure for about 16 hours. A powdery, white, non-hygroscopic solid having a melting point of 205–210° C. was obtained and identified as N,N,N',N'-tetrakis(2-hydroxypropyl) ethylene diamine:$ZnCl_2$ complex.

It is of course to be understood that the foregoing examples are intended to be illustrative and that numerous changes can be made in the ingredients, proportions, and conditions set forth therein without departing from the spirit of the invention as defined in the appended claims.

I claim:
1. A complex compound adapted to be used in the vulcanization of polymers, said compound being a solid coordination complex of an N,N,N',N'-tetrakis(hydroxyalkyl)alkylene diamine and heavy metal halide, the mole ratio of heavy metal halide to diamine being greater than 1:1.
2. A complex compound according to claim 1 and wherein the ratio of metal halide to diamine is approximately 2:1.
3. A complex compound according to claim 1 and wherein said heavy metal halide is a mixture of metal halides.
4. The complex compound of claim 1 wherein said N,N,N',N'-tetrakis(hydroxyalkyl)alkylene diamine compound comprises hydroxy lower alkyl groups.
5. A complex compound according to claim 1 and wherein said complex is a solid N,N,N',N'-tetrakis(2-hydroxypropyl)ethylene diamine:zinc chloride complex.
6. A complex compound according to claim 1 and wherein said complex is a solid N,N,N',N'-tetrakis-(2-hydroxypropyl)ethylene diamine:cadmium chloride complex.
7. A complex compound according to claim 1 and wherein said complex is a solid N,N,N',N'-tetrakis(2-hydroxypropyl)ethylene diamine:manganese chloride complex.
8. A complex compound according to claim 1 and wherein said complex is a solid N,N,N',N'-tetrakis(2-hydroxypropyl)ethylene diamine:chromium chloride complex.
9. A complex compound according to claim 1 and wherein said complex is a solid N,N,N',N'-tetrakis(2-hydroxypropyl)ethylene diamine:cobalt chloride complex.
10. A complex compound according to claim 1 and wherein said complex is a solid N,N,N',N'-tetrakis(2-hydroxypropyl)ethylene diamine:zinc chloride-cadmium chloride complex.

References Cited

UNITED STATES PATENTS

| 2,686,798 | 8/1954 | Gmitter | 260—429 |
| 2,965,615 | 12/1960 | Tess | 260—77.5 |
| 3,036,996 | 5/1962 | Kogon | 260—77.5 |
| 3,077,487 | 2/1963 | Ramsey | 260—429 |

OTHER REFERENCES

Hall et al., Journ. Am. Chem. Soc., vol. 82 (1960), pages 3303–3308.

Keyworth, Talanta, vol. 2 (1959), pages 383–4.

TOBIAS E. LEVOW, *Primary Examiner.*

DONALD E. CZAJA, LEON J. BERCOVITZ,
                                            *Examiners.*

M. C. JACOBS, A. P. DEMERS, *Assistant Examiners.*

UNITED STATES PATENT OFFICE
CERTIFICATE OF CORRECTION

Patent No. 3,355,466                                   November 28, 1967

Harold L. Elkin

It is hereby certified that error appears in the above numbered patent requiring correction and that the said Letters Patent should read as corrected below.

Column 1, lines 30 and 31, for "factorily with the conventional sulfur curing systems which are used for natural rubber, GR-S, and neoprene. The" read -- plexes with organic compounds like mercaptobenzothiazole or metal halide complexes with tertiary amines. The --.

Signed and sealed this 3rd day of December 1968.

(SEAL)
Attest:

M. Fletcher, Jr.                                          EDWARD J. BRENNER ng Officer                                                  Commissioner of Patents